July 18, 1950          F. T. COURT          2,515,395

HYDRAULIC MECHANISM

Filed Feb. 5, 1945          3 Sheets—Sheet 1

INVENTOR.
FRANK T. COURT

July 18, 1950 — F. T. COURT — 2,515,395
HYDRAULIC MECHANISM
Filed Feb. 5, 1945 — 3 Sheets-Sheet 2
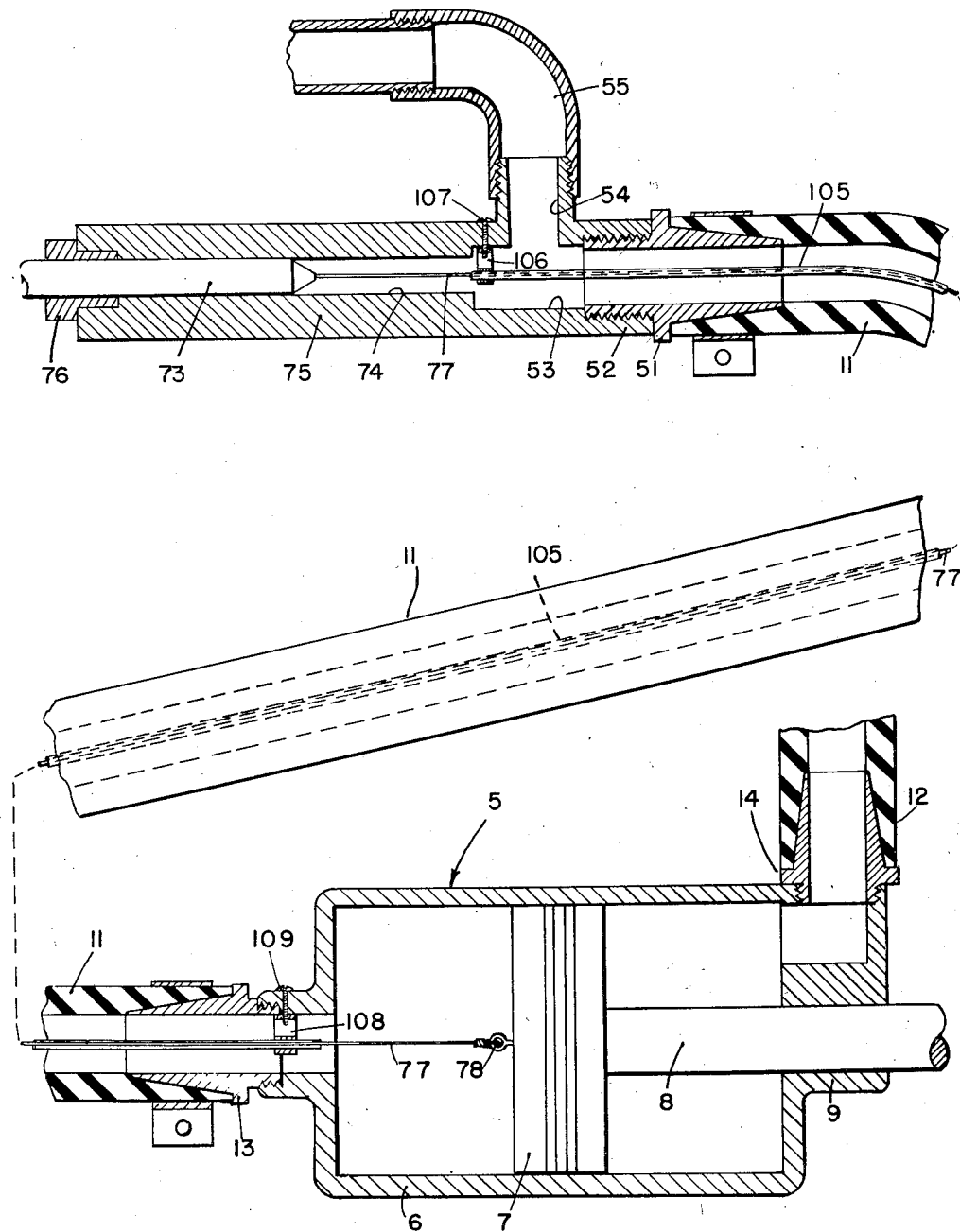
FIG. 2.
INVENTOR.
FRANK T. COURT
BY 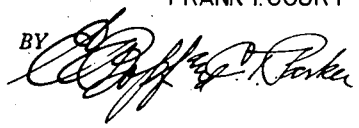

INVENTOR.
FRANK T. COURT

Patented July 18, 1950

2,515,395

UNITED STATES PATENT OFFICE 2,515,395

HYDRAULIC MECHANISM

Frank T. Court, Moline, Ill., assignor to Deere & Company, Moline, Ill., a corporation of Illinois Application February 5, 1945, Serial No. 576,281

14 Claims. (Cl. 121—41)

1

The present invention relates generally to hydraulic mechanism and more particularly to that type of hydraulic mechanism in which the position of the control lever at any time is an indication of the position of the piston in the hydraulic motor. In this type of mechanism, the extent of movement of the piston within the cylinder of the motor is proportional to the extent of movement of the control lever. Mechanism of this type is known to those skilled in the art, but heretofore it has been applied only in cases where the hydraulic motor is mounted on the same frame as the control valve, and sufficiently close to the latter to permit some form of mechanical linkage between the motor piston and the valve. Heretofore, however, it has not been considered practicable to employ these principles in connection with a remotely disposed cylinder, particularly where the latter is mounted on a support which is movable relative to the support for the valve, such as, for example, where the valve mechanism is mounted on a tractor or other draft vehicle and the hydraulic cylinder is mounted on a trailing vehicle or implement.

In my co-pending application, Serial No. 561,433, filed November 1, 1944, now Patent No. 2,482,249, granted Sept. 20, 1949, I have shown one solution of this problem, in which the extent of movement of the piston of a remotely disposed cylinder is measured by a flow meter mounted at the control valve, which measures the amount of hydraulic fluid which flows to or from the cylinder, the flow meter being connected with the control lever to make the necessary adjustment thereof. The present invention is in the nature of an improvement over the device disclosed in my said co-pending application, and has for its principal object the provision of a novel and simplified control mechanism of this type, which eliminates the flow meter and is therefore considerably less expensive, but which is more positive and efficient in its operation.

More specifically, an object of the present invention relates to the provision of a hydraulic control mechanism in which the hydraulic motor moves an extent proportional to the movement of the control lever and is positive and accurate in its operation, regardless of changes of position of the hydraulic motor relative to the control mechanism.

In the accomplishment of these objects, I have provided a flexible connection between the piston of the hydraulic motor and the control lever, in the form of a flexible wire which is connected to the piston within the cylinder and extends through the supply conduit to a suitable connection with the control valve. Inasmuch as the supply hose and control wire flex together, there is no appreciable relative longitudinal movement therebetween. There will, of course, be a slight

2 inaccuracy due to the difference in diameter between the inside of the conduit and the wire, so that unless the conduit is substantially straight, there would be a certain amount of slack to be taken up in the wire whenever the piston changes its direction of movement. Hence, it is a further object of my invention to eliminate this slack in the control wire, causing it to be stressed in tension at all times, regardless of the direction the piston is traveling in the cylinder. In the accomplishment of this object, I have provided a small piston operating in a cylinder at the end of the conduit adjacent the control valve and this end of the wire is connected to the small piston, which is subjected at all times to the pressure within the conduit. Hence, there is always a pressure against the small piston, tending to force it outwardly and thereby stressing the wire in tension.

These and other objects and advantages of my invention will be apparent to those skilled in the art after a consideration of the following description, in which reference is had to the drawings appended hereto, in which:

Figure 2 is a diagrammatic view of a part of the system and drawn to an enlarged scale, showing a modified form of my invention.

Figures 1, 4:
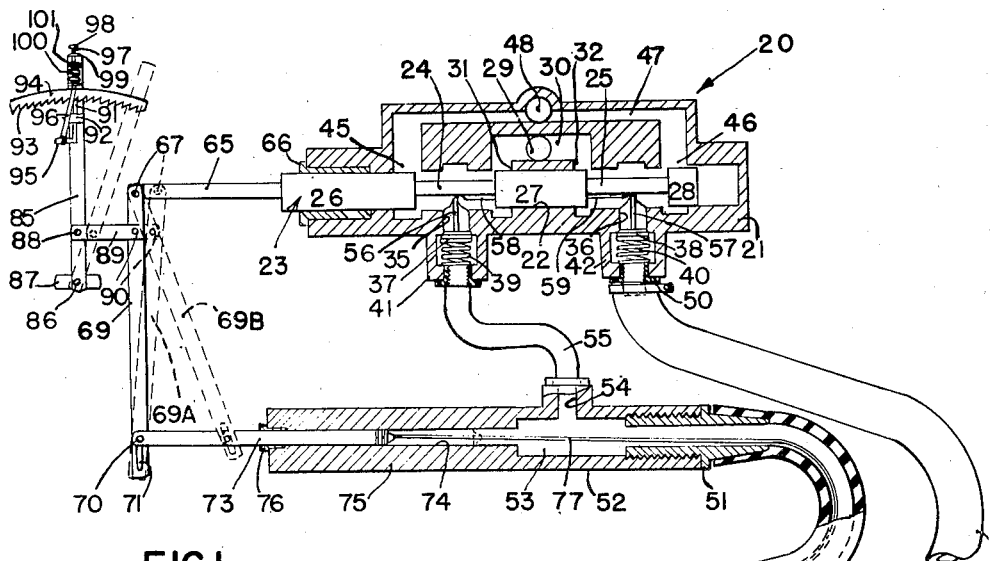
Figure 1 is a diagrammatic view of a hydraulic system embodying the principles of my invention.
Figure 3 is a diagrammatic view similar to Figure 2 but showing a second modified form of the invention and Figure 4 is a fragmentary sectional view of the inner conduit and an associated plunger of the structure of Figure 3.

Referring now to the drawings and more particularly to Figure 1, the hydraulic system includes a hydraulic motor 5 comprising a cylinder 6 and a piston 7 slidable axially therein. The piston 7 is attached to a piston rod 8, which extends outwardly through a sealing gland 9 and is provided with a connector 10 by which the piston rod 8 can be connected to any load which is desired to be moved. The motor 5 is double acting, that is to say, the piston 7 can be shifted in either direction within the cylinder 6 by applying hydraulic pressure to either side thereof, selectively. To this end, the cylinder is connected to a pair of conduits 11, 12, which are connected by suitable fittings 13, 14 in communication with the two ends of the cylinder 6, respectively. The conduits 11, 12 are shown as flexible rubber pressure hoses, which permit the motor 5 to be shifted relative to the outer parts of the mechanism at any time. Obviously however, the conduits 11, 12 need not be flexible but may be rigid connecting pipes or tubes.

The piston 7 is shifted axially within the cylinder by forcing hydraulic fluid, preferably oil, under pressure through one of the conduits 11, 12, and permitting the fluid from the opposite end of the cylinder to be discharged through the other of the conduits, in a manner well known to those skilled in the art. The flow of fluid is controlled by a control valve 20, which can be of any suitable type known to those skilled in the art but preferably of the balanced piston valve type comprising a casing 21, within which is disposed a longitudinally disposed cylindrical bore 22, within which is slidably disposed a cylindrical valve member 23 having a pair of axially spaced portions 24, 25 of reduced diameter, leaving three axially spaced portions 26, 27, 28 which act as pistons within the cylinder bore 22.

The oil is supplied to the casing 20 through a supply duct 29, by means of any suitable pump, which is not shown since the details thereof form no part of the present invention. The duct 29 communicates with an axially extending passage 30, which connects at opposite ends, respectively, with a pair of annular grooves or enlargements 31, 32 in the cylindrical bore 22. Spaced axially from the grooves 31, 32 are two ports 35, 36, which communicate with the bore 22 and extend radially outwardly from the bore 22 and are normally closed by a pair of check valves 37, 38, which are biased toward closed position by a pair of springs 39, 40 which are disposed in casing extensions 41, 42.

A pair of exhaust ports 45, 46, which are also in the form of annular peripheral grooves or enlargements in the bore 22, are interconnected by an axially extending passage 47, which communicates with a discharge duct 48, which leads to a suitable reservoir (not shown), from which the oil for the pump is taken.

One of the cylinder conduits 12 is connected by a suitable fitting 50 to one of the casing extensions 42 and communicates with the cylindrical bore 22 through the check valve port 36. The other cylinder conduit 11 is connected by a suitable fitting 51 to one end of a tubular housing 52, the interior 53 of which is connected by a transverse passage 54 to a pipe or conduit 55, which connects in communication with the casing extension 41, and through the other check valve port 35 to the cylindrical valve bore 22.

The check valves 37, 38 are provided with inwardly extending valve stems 56, 57, which are engageable with a pair of axially extending cams or ridges 58, 59, respectively, on the valve member 23. When the valve member 23 is in a centrally disposed neutral position, as shown in Figure 1, the valve stems 56, 57 do not engage the camming ridges 58, 59, but when the valve member 23 is shifted toward the left, the cam 58 thereon engages the valve stem 56 and opens the check valve 37 against the action of the spring 39. When the valve member 23 is shifted toward the right, the cam 59 engages the valve stem 57, thereby opening the check valve 38 against the spring 40. In each case, only one of the check valves is opened by its cam, while the other is not engaged by the valve member 23.

The operation of the system thus far described, is as follows: With the valve member in neutral position, it will be noted from Figure 1 that the oil supply ports 31, 32 are connected with the exhaust ports 45, 46, by virtue of the fact that the portions 24, 25 of reduced diameter of the valve member 23 are long enough to provide passages for the oil between the supply and the exhaust ducts. Assuming that the valve member 23 be shifted toward the right in the housing 21, the exhaust port 45 is blocked by the piston portion 26, while the supply port 32 is blocked by the piston portion 27. Oil from the supply duct 29 therefore flows through the passage 30, port 31, and along the reduced diameter portion 24, forcing open the check valve 37 against its spring 39, thus opening the port 35 through which the oil flows to the cylinder 6, by way of the conduit 55 and flexible hose 11. The pressure of the oil on the left side of the piston 7 forces the latter toward the right, and also forces oil from the right end of the cylinder 6 through the flexible hose 12. The initial movement of the valve member 23 causes the cam 59 to engage the valve stem 57, opening the check valve 38, which permits the oil from the hose 12 to flow through the check valve port 36 and the exhaust port 46 into the exhaust duct 47, 48 back to the reservoir. Whenever the valve member 23 is returned to neutral position, the supply and discharge ducts 29, 48 are again short circuited by the reduced diameter portions 24, 25 of the valve member 23, and the check valves 37, 38 are immediately closed by their springs 39, 40.

Conversely, the piston 7 can be shifted toward the left in the cylinder 6 by shifting the valve member 23 toward the left, thereby blocking the supply port 31 and exhaust port 46, and opening the check valve 37 by means of the cam 58, whereupon the oil flows from the supply duct 29 through the port 32, forcing open the check valve 38 and flowing to the right side of the cylinder through the flexible hose 12. Oil from the left end of the cylinder is forced outwardly by the piston 7 through the flexible hose 11 and into the housing 21 by way of the duct 55 and check valve port 35, and out through the exhaust port 45 to the discharge duct 48.

Inasmuch as there is frequently a small amount of air trapped in the cylinder or hose connections, it is desirable to maintain the cylinder under a high pressure at all times, even when the piston 7 is stationary within the cylinder 6, in order to lock the piston 7 rigidly in its adjusted position. This is accomplished by proportioning the length of the cams 58, 59 and the piston portions 26, 27, 28 of the valve member 23 so that pressure is applied to one end of the cylinder 6 an instant before the check valve on the other side is opened to release the oil on that side of the piston 7, and conversely, to close the check valve an instant before the pressure is relieved in order to build up a high pressure within the cylinder 6 as the valve member 23 is returned to its neutral position. For example, when the valve member 23 is shifted toward the left, the piston portion 28 blocks off the exhaust port 46 before the cam 58 engages the valve stem 56, whereupon the oil is forced through the check valve 38 and into the right end of the cylinder 6 before the check valve 37 is opened to relieve the pressure from the left end of the cylinder 6. When the valve member 23 is returned to neutral, therefore, the check valve 37 is disengaged by the cam 58 an instant before the piston portion 28 uncovers the port 46 in the exhaust passage, thereby permitting the pressure to build up to a high value within the cylinder 6, which pressure is maintained by the check valves 37, 38 to lock the piston 7 rigidly in adjusted position. This locking pressure is limited by the conventional excess pressure release valve (not shown) which is provided for safety purposes in all hydraulic pressure systems. This principle of locking the piston 7 within the cylinder 6 is described in detail and claimed in my co-pending application 561,433, mentioned above.

The valve member 23 is shifted by means of a connecting rod 65, which is attached to the outer end of the piston portion 26, the latter extending outwardly through the open end of the cylindrical bore 22 and is sealed by a sealing bushing 66 in the end of the valve casing 21. The outer end of the connecting rod 65 is connected by a pivot 67 to one end of a control member 69 in the form of a lever, the opposite end of which is swingably connected by a pin 70 slidable in a longitudinal slot 71 in the member 69, the pin 70 being mounted at one end of a plunger 73, which is slidable within a cylinder 74 of comparatively small diameter, within a tubular portion 75 of the casing 52. The small diameter cylinder 74 is disposed in axial alignment with the fitting 51 and the end of the conduit 11, and communicates with the interior 53 of the casing 52. The outer end of the small cylinder 74 is sealed by a suitable bushing 76 in the end of the tubular portion 75. A flexible wire 77, preferably a piano wire, is connected to the inner end of the plunger 73 and extends axially through the small cylinder 74, interior 53, and the cylinder hose 11 into the motor cylinder 6, and is connected to the piston 7 by a suitable connector 78.

A manually actuated lever 85 is pivotally mounted at 86 on a relatively stationary support 87. The stationary support 87 is mounted rigidly relative to the control housing 21 and the casing 52, as there should be no relative movement between these three elements, while the motor cylinder 6 can be mounted in any desired remote position, and may be movable with respect to the housing 21, casing 52, and support 87. For example, the latter three elements can be mounted on a tractor, while the motor cylinder 6 can be mounted on a trailing vehicle or implement which can be connected for lateral swinging movement to the tractor in a manner well known to those skilled in the art.

The manually actuated lever 85 is pivotally connected at 88 to a link 89, which is pivotally connected at 90 to the lever 69 intermediate the pivot connections 67, 70. Thus, it is evident that the control lever 69 is differentially connected by three pivot connections 67, 70, 90 to the three movable control elements 65, 73, 85, so that the lever 69 can swing about one or more of the pivots as a fulcrum by force exerted through another of the pivots to shift the third pivot, as will be explained.

The manually actuated lever 85 is securable in adjusted position by means of a latch dog 91 guidable vertically through a support 92 on the side of the lever 85. The dog 91 engages the lower serrated edge 93 of a sector 94, which is mounted rigidly with the support 87 by any suitable means (not shown). The lower end of the latch dog 91 is provided with an arm 95 which is connected to a rod 96 to the lower end of a shank 97 having a button 98 at its upper end. The shank 97 is slidably supported in a portion 99 of the lever 85 and is vertically movable therein. A spring 100 encircles the shank 97 and bears against a washer 101 fixed to the shank 97 to urge the latter upwardly. The operator can grasp the upper end of the lever 85 and depress the button 98 with his thumb, thereby retracting the dog 91 from the serrated edge 93 of the sector 94, permitting him to swing the lever 85 about the pivot 86. When he releases the lever and the button 98, the spring 100 engages the dog 91 with the serrated edge 93, thereby securing the lever in adjusted position.

The parts are shown in solid lines in the positions they occupy with the motor piston 7 approximately midway between the ends of the cylinder 6, in which the manually adjustable lever 85 is disposed substantially midway on the sector 94. As explained above, there is a relatively high pressure maintained within the cylinder 6 and the conduits between the cylinder and the check valves 37, 38, and hence the same pressure is applied to the inner end of plunger 73, thereby maintaining a tension in the wire 77. Now assume that the operator desires to move the piston 7 from the position shown in Figure 1, to the right end of the cylinder 6, he grasps the lever 85, depresses the button 98, and swings the lever toward the right to the extreme end of the sector 94. Inasmuch as the plunger 73 is rigidly held in the position shown, it is evident that by swinging the lever 85 toward the right, the control lever 69 swings about its lower pivot 70 as a fulcrum to the dotted line position 69a, thereby shifting the valve member 23 inwardly toward the right in the housing 21. In the manner described above, the piston 7 is moved toward the right in the cylinder 6, by pressure exerted through the flexible hose 11, and as it moves it pulls the wire 77 through the hose, thereby shifting the plunger 73 toward the right within the cylinder 74. During this movement, however, the manual lever 85 is retained by the dog 91 at the right end of the sector 94, which holds the intermediate pivot 90 relatively stationary, whereupon the differential lever 69 is swung about the pivot 90 from the position 69a to the position 69b, thereby swinging the upper end of the lever 69 toward the left, returning the upper pivot 67 to its original position and thereby returning the valve member 23 to its neutral position, stopping the supply of oil to the cylinder 6. Obviously, if the lever 85 has been moved a shorter distance along the sector 94, the pivot 67 would not have been moved as far as shown in dotted lines and therefore the lever 69 would have been returned to its original position to shut off the oil before the piston 7 had reached the extreme end of the cylinder 6. Thus, it is evident that the extent of movement of the piston 7 is proportional to the extent of movement of the lever 85.

The piston 7 can be returned toward the left of the cylinder 6 by swinging the lever 85 toward the left in any adjusted position, thereby swinging the lever 69 about the pivot 70 to shift the valve member 23 toward the left, causing oil to flow under pressure into the right end of the cylinder through the hose 12, while the oil from the left end of the cylinder is forced through the hose 11 back to the reservoir. This movement of the piston 7 is transmitted through the wire 77, to slide the plunger 73 outwardly through the cylinder 74, thereby swinging the lever 69 in a clockwise direction about the fulcrum 90 to return the valve member 23 to its neutral position. To prevent the wire 77 from buckling at this time and to maintain the wire in tension, the transverse port 54 in the casing 52 is made with sufficient restriction that the oil in the interior 53 and cylinder 74 is maintained under sufficient pressure as it is forced through the port 54, to urge the plunger 73 outwardly through the cylinder 74. Thus, there is no slack in the wire 77 to take up each time the piston 7 reverses its direction.

Referring now to Figure 2, this embodiment of my invention is identical with the embodiment shown in Figure 1 with the exception that the connecting wire 77 is encased within a flexible tube 105 of small diameter, within which the wire 77 is axially slidable. One end of the flexible tubing is rigidly fixed to a small bracket 106, which is rigidly anchored within the casing 52 by means of a screw 107. The opposite end of the flexible tube 105 is rigidly fixed to a bracket 108 which is rigidly anchored by a screw 109 to the cylinder 6. The addition of this flexible tubing in which the wire 77 is encased eliminates the necessity for restricting the opening 54 in order to maintain a pressure within the cylinder 74 to keep the slack out of the wire 77. It is well known to those skilled in the art, that control wires will operate in either direction through a tubular casing which is anchored at both ends, as there is no buckling of the control wire during movement in either direction.

Figure 3:
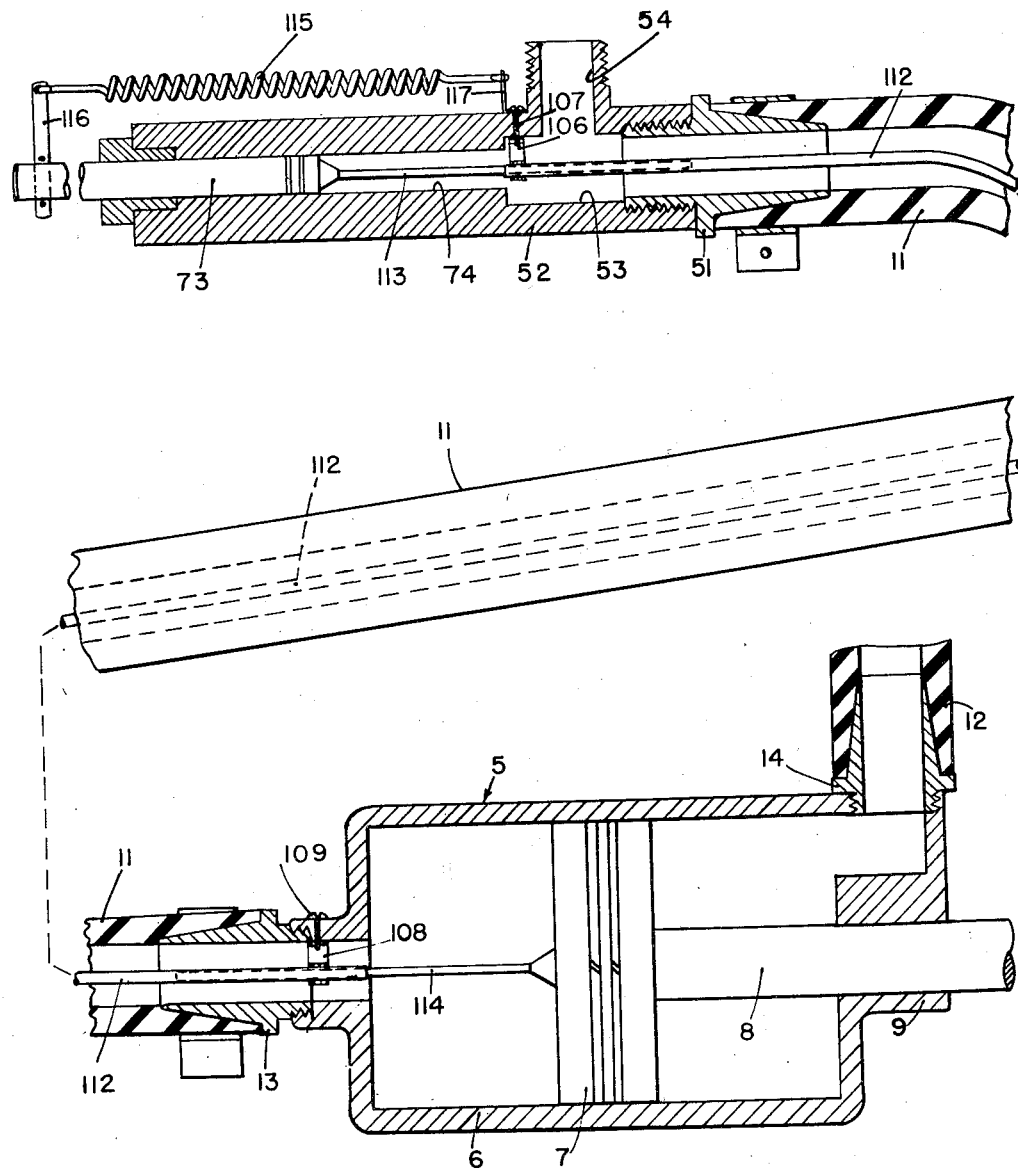

Figure 3 shows a third means for connecting the piston with the control valve mechanism, by means extending through the cylinder hose, and in this case it comprises a flexible tube 112 of small diameter, which is fluid tight and filled with hydraulic fluid, preferably the same oil that is used in the cylinder 6 itself. A pair of small diameter plungers 113, 114 are inserted into the two ends of the flexible tube 112, respectively, and serve as pistons or plungers therein. The oil within the flexible tube 112 is maintained under compression by means of a coil spring 115, which is connected to a bracket 116 fixed to the plunger 73, and anchored to a bracket 117 secured to the casing 52 by the screw 107. Since the spring 115 is strong enough to overcome any pressure on the end of the plunger 73 when the piston 7 is moving toward the right and forcing oil out through the hose 12, the movement of the piston 7 is transmitted to the plunger 73 through the liquid within the small flexible tube 112, thereby producing a result similar to those obtained by the other embodiments of my invention.

While I have shown in each embodiment a double acting cylinder, it will be obvious to those skilled in the art that the principles of my invention can be applied equally well to a single acting cylinder, where only one of the cylinder conduits is used for making the connection between the motor piston and the control valve mechanism. I do not intend my invention to be limited to the particular details shown and described herein, except as set forth in the claims which follow.

I claim:

1. In hydraulic mechanism, a cylinder, a piston slidable therein, a source of fluid under pressure, valve means for controlling the flow of fluid to said cylinder, conduit means connecting said valve means and said cylinder for conducting fluid to and from the latter, said conduit means having at least one bend or turn, and control means for actuating said valve means including a flexible but substantially non-extensible connecting means extending through said conduit means for connecting said piston with said valve means.

2. In hydraulic mechanism, a cylinder, a piston slidable therein, a source of fluid under pressure, valve means for controlling the flow of fluid to said cylinder, conduit means connecting said valve means and said cylinder for conducting fluid to and from the latter, and control means for actuating said valve means including means for shifting the valve means to start said piston, and means including a portion having connection with the valve means and another portion contained within the conduit means and having connection with the piston at normal working pressure in the system for actuating the valve means to stop said piston.

3. In hydraulic mechanism, a cylinder, a piston slidable therein, a source of fluid under pressure, valve means for controlling the flow of fluid to said cylinder, conduit means connecting said valve means and said cylinder for conducting fluid to and from the latter and control means for actuating said valve means including a control member differentially connected with said valve means and with said piston, the latter connection including a member extending through said conduit means into said cylinder.

4. In hydraulic mechanism, a cylinder, a piston slidable therein, a source of fluid under pressure, valve means for controlling the flow of fluid to said cylinder, conduit means connecting said valve means and said cylinder for conducting fluid to and from the latter in various positions of said cylinder relative to said valve means, and control means for actuating said valve means including a lever pivotally connected with said valve means and swingable about a fulcrum spaced from said pivot connection, and means for connecting said fulcrum to said piston including a non-extensible wire connected to said piston and extending through said conduit means, and means connecting the other end of said wire with said fulcrum.

5. In hydraulic mechanism, a cylinder, a piston slidable therein, a source of fluid under pressure, valve means for controlling the flow of fluid to said cylinder, conduit means connecting said valve means and said cylinder for conducting fluid to and from the latter and control means for actuating said valve means comprising connecting means extending through said conduit means into said cylinder and connected with said piston, a tubular member disposed in alignment with the other end of said conduit means and communicating therewith, a plunger slidable within said tubular member and connected to the other end of said connecting means and projecting from said tubular means, and means connecting the outer end of said plunger with said valve means.

6. In hydraulic mechanism, a cylinder, a piston slidable therein, a source of fluid under pressure, valve means for controlling the flow of fluid to said cylinder, conduit means connecting said valve means and said cylinder for conducting fluid to and from the latter, and control means for actuating said valve means including a control member differentially connected with said valve means and with said piston, said connection with said piston including tubular means aligned with the end of said conduit means opposite said cylinder and serving as a control cylinder, a plunger slidably disposed within said tubular means, the outer end of said plunger being connected with said control member, and a wire connected to the inner end of said plunger and extending through said conduit means and attached to said piston.

7. In hydraulic mechanism, a cylinder, a piston slidable therein, a source of fluid under pressure, valve means for controlling the flow of fluid to said cylinder, conduit means connecting said valve means and said cylinder for conducting fluid to and from the latter in various positions of said cylinder relative to said valve means, and the control means for actuating said valve means including a lever pivotally connected with said valve means and swingable about a fulcrum spaced from said pivot connection, and means for connecting said fulcrum with said piston including a tubular element disposed in alignment with the end of said conduit means opposite said cylinder, a plunger slidably disposed within said tubular element and connected with said fulcrum, and a wire extending through said conduit means and connected at opposite ends to said plunger and said piston, respectively.

8. In hydraulic mechanism, a cylinder, a piston slidable therein, a source of fluid under pressure, a pair of hoses connecting said source with opposite ends of said cylinder, respectively, for conducting fluid thereto, valve means connected with the opposite ends of said hoses for controlling the flow of fluid therein, and control means for actuating said valve means comprising a control member differentially connected with said valve means and with said piston, the latter connection including a wire extending through one of said hoses and attached at one end to said piston, and means connecting the other end of the wire to said control member.

9. In hydraulic mechanism, a fluid circuit comprising a fluid pressure operated motor including a casing and a member movable therein, a source of fluid under pressure and conduit means connecting said source with said casing for supplying fluid thereto, valve means for controlling the flow of fluid to said motor, and means for controlling said valve means including means separate from said fluid circuit and extending through said conduit means and connected with said movable member.

10. In hydraulic mechanism, a cylinder, a piston slidable therein, a source of fluid under pressure, valve means for controlling the flow of fluid to said cylinder, conduit means connecting said valve and said cylinder for conducting fluid to and from the latter in various positions of said cylinder relative to said valve means, and control means for actuating said valve means including tubing extending through said conduit means and fixed relative thereto at opposite ends, respectively, and a wire extending slidably through said tubing and connected to said piston at one end thereof, the other end being connected with said valve means.

11. In hydraulic mechanism, a cylinder, a piston slidable therein, a source of fluid under pressure, valve means for controlling the flow of fluid to said cylinder, conduit means connecting said valve means and said cylinder for conducting fluid to and from the latter in various positions of said cylinder relative to said valve means, and control means for actuating said valve means including a lever pivotally connected with said valve means and swingable about a fulcrum spaced from said pivot connection, and means for connecting said fulcrum to said piston for movement therewith including tubing extending through said conduit means and fixed relative thereto at opposite ends, respectively, and a wire connected to said piston and extending slidably through said tubing, and means connecting the other end of said wire with said fulcrum.

12. In hydraulic mechanism, a cylinder, a piston slidable therein, a source of fluid under pressure, valve means for controlling the flow of fluid to said cylinder, conduit means connecting said valve means and said cylinder for conducting fluid to and from the latter in various positions of said cylinder relative to said valve means, and control means for actuating said valve means including tubing extending through said conduit means and fixed relative thereto at opposite ends, respectively, a plunger in one end of said tubing connected with said piston and shiftable axially by movements of the piston in said cylinder, a second plunger in the other end of said tubing and means connecting said second plunger with said valve means for shifting the latter responsive to movements of said piston, the movement being transmitted through fluid in said tubing.

13. In hydraulic mechanism, a cylinder, a piston slidable therein, a source of fluid under pressure, valve means for controlling the flow of fluid to said cylinder, conduit means connecting said valve means and said cylinder for conducting fluid to and from the latter in various positions of said cylinder relative to said valve means, and control means for actuating said valve means including a lever pivotally connected with said valve means and swingable about a fulcrum spaced from said pivot connection, and means for connecting said fulcrum to said piston for movement therewith including tubing extending through said conduit means and fixed relative thereto at opposite ends, respectively, a plunger in one end of said tubing connected with said piston and shiftable axially by movements of the piston in said cylinder, a second plunger in the other end of said tubing and means connecting said second plunger with said fulcrum, said tubing being filled with hydraulic fluid to transmit force between said plungers.

14. In hydraulic mechanism, a fluid circuit comprising a fluid pressure operated motor including a casing and a member movable therein, a source of fluid under pressure and conduit means connecting said source with said casing for supplying fluid thereto, valve means for controlling the flow of fluid to said motor, and means for controlling said valve means including a separate and independent fluid circuit within said conduit means and having connection with the valve means and the movable motor member.

FRANK T. COURT.

REFERENCES CITED

The following references are of record in the file of this patent:

UNITED STATES PATENTS

| Number | Name | Date |
|---|---|---|
| 439,763 | Purvis | Nov. 4, 1890 |
| 1,490,587 | Brunton | Apr. 15, 1924 |
| 1,866,298 | Didinger | July 5, 1932 |
| 1,990,814 | Castro | Feb. 12, 1935 |
| 2,109,114 | Kerr | Feb. 22, 1938 |
| 2,192,963 | Davis | Mar. 12, 1940 |
| 2,203,296 | Fleischel | June 4, 1940 |
| 2,226,821 | Kempson | Dec. 31, 1940 |
| 2,273,171 | Bennett | Feb. 17, 1942 |
| 2,313,002 | Mennesson | Mar. 2, 1943 |
| 2,406,173 | Stephens | Aug. 20, 1946 |

FOREIGN PATENTS

| Number | Country | Date |
|---|---|---|
| 832,573 | France | July 4, 1938 |